(12) United States Patent
Ebihara

(10) Patent No.: US 7,017,065 B2
(45) Date of Patent: *Mar. 21, 2006

(54) SYSTEM AND METHOD FOR PROCESSING INFORMATION, AND RECORDING MEDIUM

(75) Inventor: Hitoshi Ebihara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 557 days.

This patent is subject to a terminal disclaimer.

(21) Appl. No.: 10/285,741

(22) Filed: Nov. 1, 2002

(65) Prior Publication Data

US 2003/0135651 A1 Jul. 17, 2003

(30) Foreign Application Priority Data

Nov. 2, 2001 (JP) .............................. 2001-338463

(51) Int. Cl.
*G06F 1/12* (2006.01)

(52) U.S. Cl. ...................... 713/400; 713/375; 713/400; 713/500; 713/502; 713/600; 345/213; 345/629; 345/630; 360/24; 360/26; 360/27; 360/39

(58) Field of Classification Search ................ 713/375, 713/400, 502, 600, 500; 345/213, 629, 6; 360/24, 26, 27

See application file for complete search history.

(56) References Cited

U.S. PATENT DOCUMENTS

| 3,753,111 | A | * | 8/1973 | Denbnovetsky et al. | 368/119 |
|---|---|---|---|---|---|
| 5,337,410 | A | * | 8/1994 | Appel | 345/501 |
| 5,646,966 | A | * | 7/1997 | Chaki et al. | 375/368 |
| 5,742,406 | A | * | 4/1998 | Suzuki | 358/468 |
| 6,744,789 | B1 | * | 6/2004 | Michener | 370/509 |
| 6,801,591 | B1 | * | 10/2004 | Frencken | 375/373 |
| 6,882,346 | B1 | * | 4/2005 | Lefebvre et al. | 345/506 |

* cited by examiner

*Primary Examiner*—Lynne H. Browne
*Assistant Examiner*—Nitin C. Patel
(74) *Attorney, Agent, or Firm*—Frommer Lawrence & Haug LLP; William S. Frommer

(57) ABSTRACT

To provide an integrated information processing unit that is capable of producing images and sounds of high quality. It includes a control unit, information processing units, and a merge unit. Each of the information processing units includes a counter for synchronization purpose. The information processing units performs a predetermined processing based on the measured value obtained by the counter for synchronization purpose. The control unit simultaneously provides a trigger of measurement of synchronization clocks to all counters for synchronization purpose and individually provides a reset signal to the counters for synchronization purpose which the reset signal is for initializing the measured value obtained by the counters for synchronization purpose. The merge unit merges information processed by the information processing units according to the unit of output (in frame) of, for example, a display device.

12 Claims, 7 Drawing Sheets

SYSTEM AND METHOD FOR PROCESSING INFORMATION, AND RECORDING MEDIUM

CROSS REFERENCE TO RELATED APPLICATIONS

The present application claims priority from Japanese Application No. 2001-338463 filed Nov. 2, 2001, the disclosure of which is hereby incorporated by reference herein.

BACKGROUND OF THE INVENTION

The present invention relates to integrated information processing that is capable of producing large screen images or sounds of a variety of different instruments, including symphonies, with high quality, by means of cooperation programs.

Sophistication of information processors has increased their opportunities to produce images or sounds with high quality. However, image processing systems such as personal computers have only the processing capabilities that they need to produce motion pictures on their associated display devices. For sound reproduction, only a limited number of speakers are available for output. Thus, attempts to produce images or sounds with high quality through typical information processing procedures may result in over-capacity of the information processor. This may produce images of lower quality than film videos or reduction in. The frame rate per second may also be reduced, deteriorating image quality. For sounds, disconnection of sounds may occur.

Distributed processing through multiple information processors would be a solution for the above-mentioned capability issue. However, cooperative processing of information by multiple information processors has harmful effects of distribution unless using a dedicated synchronization means to synchronize processes. The distributed processing can be counterproductive from the viewpoint of producing images and sounds with high quality.

Therefore, the primary object of the present invention is to provide an information processing system that is capable of performing advanced information processing with a simple configuration to produce images and sounds with high quality.

Another object of the present invention is to provide a method for processing information with which the advanced information processing can be achieved to produce images and sounds with high quality.

A still another object of the present invention is to provide a computer program that is used to cause a computer to perform such information processing.

SUMMARY OF THE INVENTION

An information processing system provided by the present invention comprises a plurality of information processing mechanisms that are coupled to each other; a merge mechanism that merges processing results supplied from the information processing mechanisms; and a control mechanism that controls operations of the information processing mechanisms.

Each of the plurality of information processing mechanisms includes a counter for synchronization purpose and processing means. The counter for synchronization purpose is adapted to count the number of synchronization clocks that are used to determine a starting point of operation for the processing that the local information processing mechanism should perform. The processing means is for carrying out a desired processing based on the measured value obtained by the counter for synchronization purpose.

The control mechanism is for simultaneously providing a trigger of measurement of the synchronization clocks to all counters for synchronization purpose included in the information processing mechanisms, and for individually providing a reset signal to the counters for synchronization purpose. The reset signal is for initializing the measured value.

The merge mechanism is for merging the processing results according to the unit of output that is determined based on the type of an information output mechanism for producing the processing results.

The information processing mechanisms may be loosely coupled to each other. The words "loosely couple" and "be loosely coupled" as used herein mean that units are coupled in such a manner that they can communicate with each other, regardless of whether the synchronization is accurate.

The counters for synchronization purpose included in the plurality of information processing mechanisms each include a first counter and a second counter. The second counter is adapted to produce a measured value at whole number fractions of the measured value obtained by the first counter. For example, this allows a usage form in which synchronization in frame is achieved by using measured values of the first counter while synchronization in detailed operations is achieved by using measured values of the second counter. In such a case, the processing means is configured to perform a predetermined processing based on the measured values of at least one of the first and second counters.

Each of the plurality of information processing mechanisms is configured in such a manner that a starting point of operation for the processing of the local information processing mechanism coincides with starting points of operation for the processing of other information processing mechanisms. Preferably, each information processing mechanism autonomously adjusts the starting point of operation.

In addition, each of the processing means included in the plurality of information processing mechanisms is configured in such a manner that the processing means detects the passage of time from the starting point of operation depending on the measured value of the counter for synchronization purpose to perform a predetermined processing based on the detection result. In a certain embodiment, these processing means are configured to perform processing to generate at least either image data or sound data that are to be merged, independent of the processing means included in other information processing mechanisms.

An information processing system of the present invention may be modified as follows.

The control mechanism includes, for example, a counter for control purpose having the same function as the counters for synchronization purpose that are included in the information processing mechanisms. The reset signal is produced based on the measured value obtained by the counter for control purpose.

The merge mechanism is configured to merge the processing results of corresponding information processing mechanisms at a predetermined timing independent of the processing status in the plurality of information processing mechanisms.

The merged result that is produced from the merge mechanism is used as an input to the control mechanism located at a subsequent stage. This achieves a cascade of multiple stages.

An information processing system according to another aspect of the present invention is a system configured in such a manner that it is connectable to a network having a plurality of information processing mechanisms that are coupled to each other and a merge mechanism connected to the information processing mechanisms, the merge mechanism being for merging the processing results supplied from the information processing mechanisms according to the unit of output that is determined based on the type of an information output mechanism for producing them, the information processing system including a control mechanism.

In this information processing system, each of the information processing mechanisms comprising an adjustment mechanism, and a counter for synchronization purpose, the adjustment mechanism being for adjusting a starting point of operation for processing that the local information processing mechanism should perform, the starting point of operation being determined with and among other information processing mechanisms, the counter for synchronization purpose counting the number of synchronization clocks, and each of the information processing system being for performing a required processing based on the starting point of operation adjusted by the adjustment mechanism and the measured value obtained by the counter for synchronization purpose.

The control mechanism is constructed for simultaneously providing a trigger of measurement of the synchronization clocks to all counters for synchronization purpose included in the information processing mechanisms, and individually provides a reset signal to the counters for synchronization purpose. The reset signal is for initializing the measured value obtained by the counters for synchronization purpose.

A method for processing information provided by the present invention is a method comprising: connecting a plurality of information processing mechanisms, a merge mechanism, and a control mechanism to each other, the plurality of information processing mechanisms being coupled to each other to perform a desired processing depending on a measured value for their respective predetermined synchronization clocks, the merge mechanism being for merging the processing results supplied from the information processing mechanisms according to the unit of output that is determined based on the type of an information output mechanism for producing them, the control mechanism controlling operations of the information processing mechanisms; and simultaneously supplying the synchronization clock from the control mechanism to all information processing mechanisms and individually supplying a reset signal to each information system, the reset signal being for initializing measurements of the synchronization clock. In such the method for processing information, some of the plurality of information processing mechanisms may handle reproduction of image data, and some other of the plurality of information processing mechanisms may handle reproduction of sound data. The merge mechanism may merge the processing results obtained by these information processing mechanisms at a predetermined timing.

A recording medium provided by the present invention is a computer readable recording medium in which a computer program is recorded, said computer program can be executed on a computer being connectable to a network.

A plurality of information processing mechanisms that are coupled to each other, and a merge mechanism connected to the information processing mechanisms are connected to the network, each information processing mechanism performs a desired processing based on a measured value of the number of predetermined synchronization clocks, the merge mechanism being for merging the information processing results supplied from the information processing mechanisms according to the unit of output that is determined based on the type of an information output mechanism for producing them.

The computer program used to cause the computer to operate such as providing a trigger of measurement of the synchronization clocks to all information processing mechanisms, and for individually providing a reset signal to the information processing mechanisms, the reset signal being for initializing the measured value obtained by the counters for synchronization purpose.

DETAILED DESCRIPTION OF THE PREFERRED EMBODIMENTS

An embodiment is described in conjunction with a case where an information processing system of the present invention is applied to integrated information processing system.

(General Structure)

Figure 1:
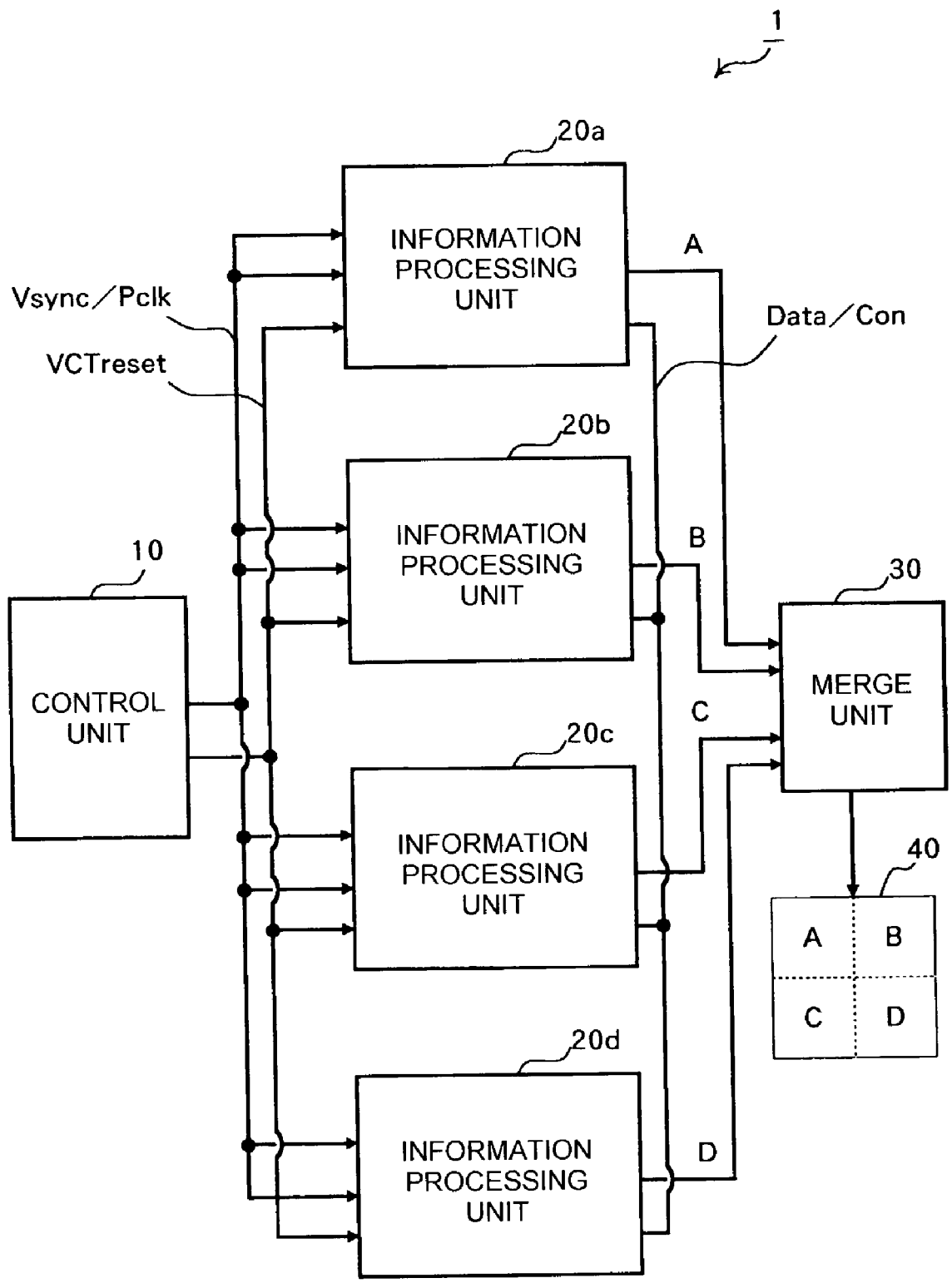
FIG. 1 shows a whole configuration of an integrated information processing system according to an embodiment of the present invention.

The integrated information processing system according to this embodiment comprises, as shown in FIG. 1, four information processing units 20a to 20d. The information processing units 20a to 20d are loosely coupled to each other via communication lines. A control unit 10 is connected to input terminals of the information processing units 20a to 20d. Output terminals of the information processing units 20a to 20d are connected to a merge unit 30.

The words "loosely couple" and "be loosely coupled" as used herein mean that units can exchange data but processes are not completely synchronized between the units.

The control unit 10 receives, from outside, data to be processed and distributes them to the information processing units 20a to 20d. The control unit 10 also supplies to the information processing units 20a to 20d the timing information that is used to determine a starting point of operation and a process timing. The timing information may be anything that can serve as a signal indicating the beginning of processing, such as a trigger, a vertical synchronization clock Vsync, process-assigned clock (e.g., a dot-assigned clock for image processing) Pclk, or a reset signal VCTreset Alternatively, a blanking pulse of a vertical synchronization clock Vsync may be used as the trigger.

The information processing units 20a to 20d carry out time series data processing along their own time line, according to the timing information and data that are supplied from the control unit 10, to generate frame signals A, B, C, and D, respectively. The frame signal A is supplied from the information processing unit 20a while the frame signal B is supplied from the information processing unit 20b. Likewise, the frame signal C is supplied from the information processing unit 20c while the frame signal D is supplied from the information processing unit 20d.

The frame signals A, B, C, and D are signals for use in displaying an image on a predetermined display device that is connected on the output side of the merge unit 30 or signals for use in producing sounds via a predetermined speaker that is connected on the output side of the merge unit.

The information processing units 20a to 20d are allowed to exchange data with each other through loosely-coupled communication lines in order to keep a balance among their processing loads. The information processing units 20a to 20d have a function of exchanging signals with each other to adjust their starting points of operation.

The merge unit produces a merged signal 40 based on the frame signals A, B, C, and D that are supplied from the information processing units 20a to 20d, respectively. The frame signals may (can) be integrated or aggregated and simply merged according to the unit of output (typically in frame) for a display device or a speaker, merge them for each divided regions, or merge them with time shifting.

(Control Unit)

Figure 2:
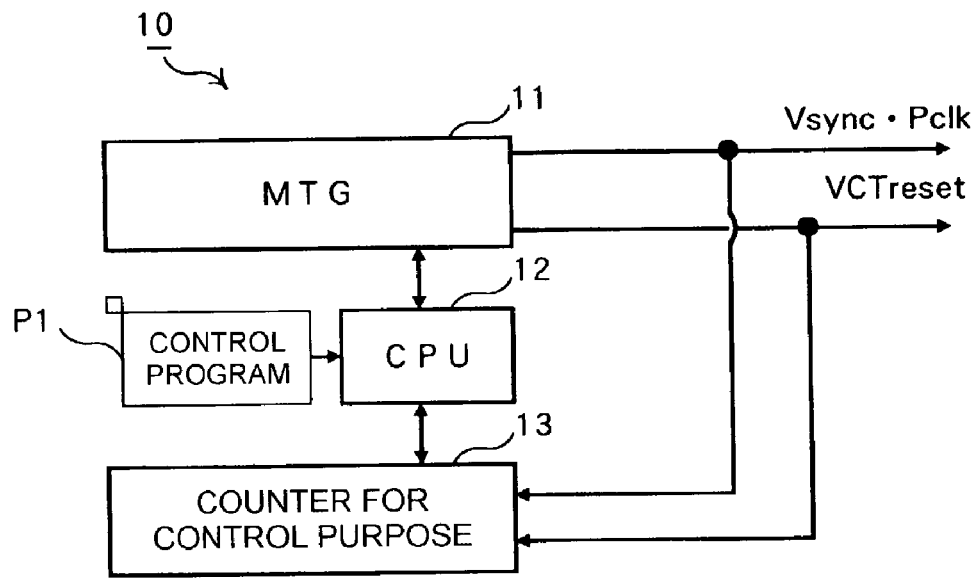
FIG. 2 is a configuration view of essentials of a control unit.

Details of each unit are described below. First, the control unit 10 is described with reference to a configuration view of essential parts shown in FIG. 2.

The control unit 10 comprises a master timing generator (hereinafter, referred to as "MTG") 11, a CPU (central processing unit) 12, and a counter for control purpose 13. Though not being illustrated in the figure, the control unit 10 also comprises a demultiplexer for data distribution purposes to allow distribution of the data received from outside to the information processing units 20a to 20d. The distribution may be made in various formats depending on an application or applications that use(s) the present system. For example, the data to be merged may be divided into four sections. Alternatively, the data to be merged may be overlapped with each other or a plurality of screen images may be displayed while delaying the timing of the display to produce flip animation.

The MTG 11 generates all timing information to be used by the present system, i.e., a trigger that serves as a signal indicating the beginning of processing, a vertical synchronization clock Vsync, a process unit clock Pclk, and a reset signal VCTreset. The MTG 11 supplies the timing information to the information processing units 20a to 20d and the counter for control purpose 13 at the same timing under the control of the CPU 12. The timing information is generated by dividing the frequencies of a common clock source. No timing shift is brought about accordingly.

The CPU 12 reads and executes a program for control purpose P1 to control distribution of the data to be processed. The CPU 12 also controls the release of the timing information from the MTG 11 in accordance with a counted value obtained by the counter for control purpose 13. More specifically, the CPU 12 supplies the same vertical synchronization clock Vsync and the same process unit clock Pclk to all information processing units 20a to 20d simultaneously. The CPU 12 determines at which timing the reset signal VCTreset should be supplied to which information processing unit. The CPU 12 then independently supplies the reset signal VCTreset to the subject information processing unit at a timing determined.

Since the same vertical synchronization clock Vsync is simultaneously supplied to all information processing units 20a to 20d, the process timing is completely synchronized among the information processing units 20a to 20d. When and what the information processing units 20a to 20d should process are determined depending on the content of the data to be supplied to the present system, a content program to be loaded onto the information processing units 20a to 20d, and timing of releasing the reset signal VCTreset based on the content of the application program(s).

(Information Processing Unit)

The information processing units 20a to 20d are identical in configuration. The following description is made for the information processing unit 20a except for the case where the individual information processing units should be specifically differentiated.

Figure 3:
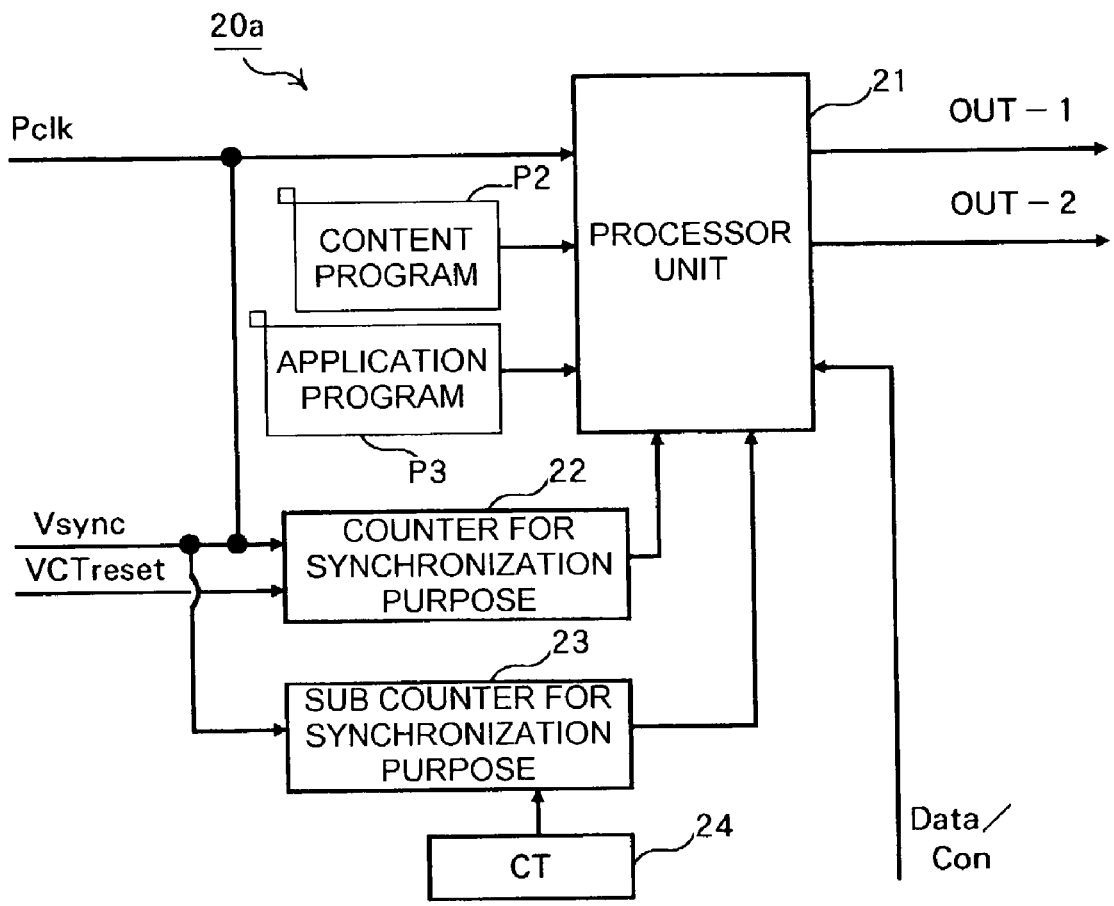
FIG. 3 is a configuration view of an information processing unit.

The information processing unit 20a has a configuration as shown in FIG. 3. It comprises a processor unit 21, a counter for synchronization purpose 22, a sub counter for synchronization purpose 23, and a clock oscillator CT. The processor unit 21 is capable of performing information processing such as image processing and sound processing. The counter for synchronization purpose 22 is used to count process timing while the sub counter for synchronization purpose 23 is used to measure the process timing with higher accuracy. The clock oscillator CT generates clocks that are measured by the sub counter for synchronization purpose 23.

In this embodiment, the counter for synchronization purpose 22 counts up the number of the vertical synchronization clocks Vsync that are supplied from the control unit 10. The counter 22 is reset in response to the reset signal VCTreset. Accordingly, it can be determined to which timing during which frame (what number frame from the beginning) the current process timing corresponds. The counter 22 begins counting up again after being reset.

The sub counter for synchronization purpose 23 counts up the number of the sub vertical synchronization clocks SVsync and is reset in response to the reset signal VCTreset. The sub vertical synchronization clocks SVsync are supplied from the clock oscillator CT at whole number fractions of the interval of the synchronization clocks Vsync. The sub vertical synchronization clocks SVsync have a sampling frequency for sounds in this embodiment, taking sound processing into consideration. More specifically, the sub vertical synchronization clocks SVsync has a frequency of, for example, 768 kHz which is a product of 48 kHz multiplied by a natural number. The sub counter for synchronization purpose 23 begins counting up again after being reset.

The counter for synchronization purpose 22 and the sub counter for synchronization purpose 23 are selectively driven. The counted values are successively supplied to a section in the processor unit 21 where the corresponding processing is performed. Which counter should be driven at which timing is previously notified by the control unit 10 according to the content of the data to be processed. For the sound processing, the sub counter for synchronization purpose 23 is typically selected for use in order to prevent a cut-off or disconnection of sounds. For the combination of the image processing and sound processing, both counters are used to identify the respective counted values. The counted values are supplied to a section of the processor unit 21 where the corresponding processing is performed.

Figure 4:
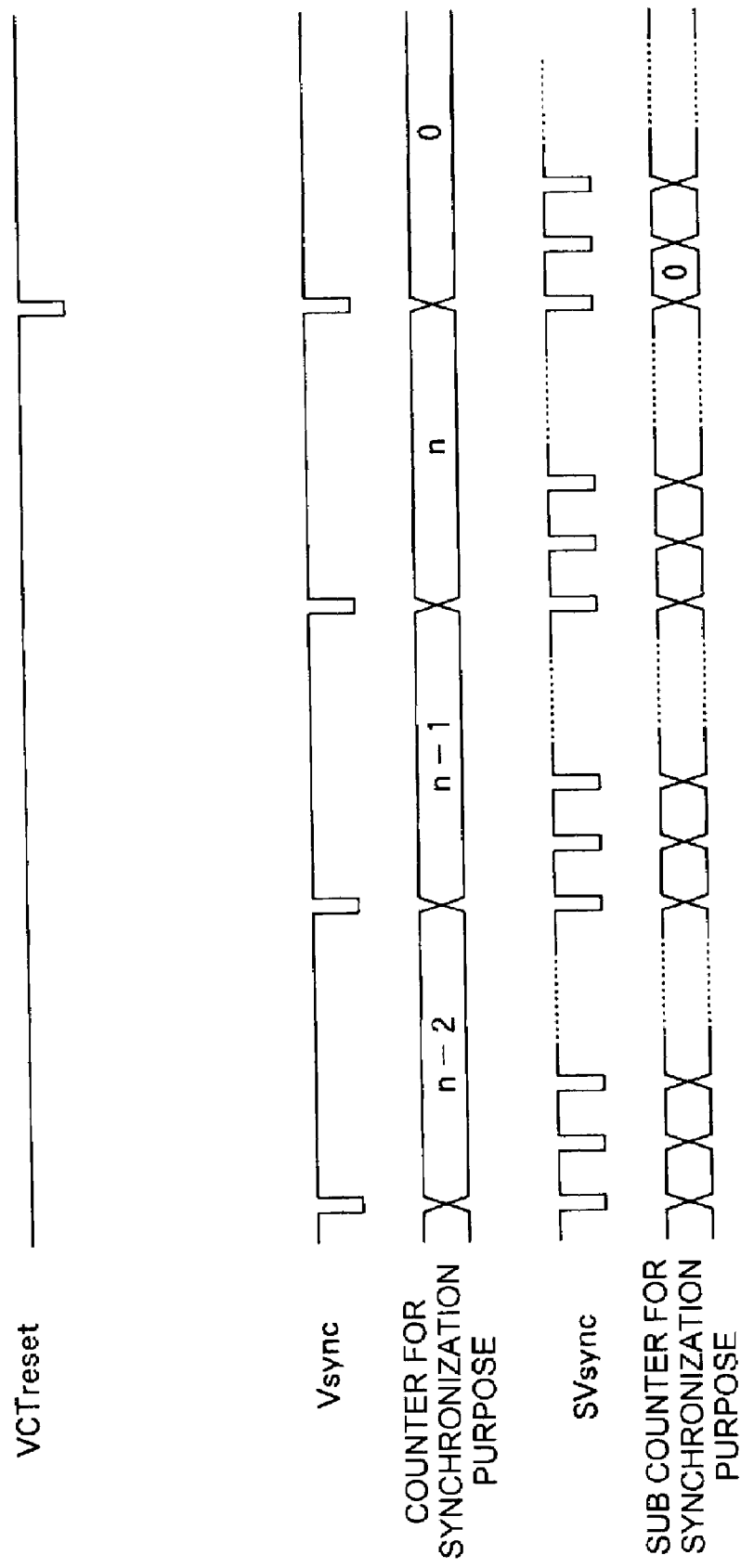
FIG. 4 is a timing chart that represents a relation among a reset signal, various synchronization clocks, and a counter for synchronization purpose, all of which are according to the present embodiment.

FIG. 4 shows a relation among the reset signal VCTreset, the vertical synchronization clock Vsync, the counted values of the counter for synchronization purpose 22 (counter for control purpose 13), the sub vertical synchronization clock SVsync, and the counted values of the sub counter for synchronization purpose 23, in the information processing unit 20a.

The counted value of the counter for synchronization purpose 22 is incremented each time when the vertical synchronization clock Vsync is enabled. The counted value is reset to the initial value (typically "0") at the time when the reset signal VCTreset is received (when the reset signal VCTreset is released only in synchronism with the interval of the vertical synchronization clock Vsync) or when the first vertical synchronization clock Vsync after the input is enabled (first falling), which is repeated.

In the processor unit 21, it is previously agreed with the processor units in other information processing units through the communication lines that the counted value of zero is considered to be zero as the absolute time. Furthermore, an offset (indicating elapsed time) between the zero timing and the above-mentioned counted value is previously adjusted. In this way, it is determined for which number frame signal among all the information processing should be performed. Loose coupling alone cannot provide cooperative operations that rely on the absolute time, such as simultaneous information processing in the whole system for a single frame. On the contrary, this can be achieved by using a mechanism as provided by the present embodiment that uses the reset signal VCTreset, the vertical synchronization clock Vsync, the counted values of the counter for synchronization purpose 22, the sub vertical synchronization clock SVsync, and the counted values of the sub counter for synchronization purpose 23.

(Merge Unit)

The information processing units 20a to 20d are supplied with the same vertical synchronization clock Vsync and the same sub vertical synchronization clock SVsync at the same timing. Consequently, the frame signal is produced from the corresponding information processing unit along the time line that is the only absolute reference in the present system according to an instruction from the control program P1 (an instruction using, for example, the reset signal VCTreset). Therefore, the merge unit 30 simply merges the frame signals and supplies the merge result to a display device or a speaker to obtain a correct and accurate result of merge processing.

Figure 5:
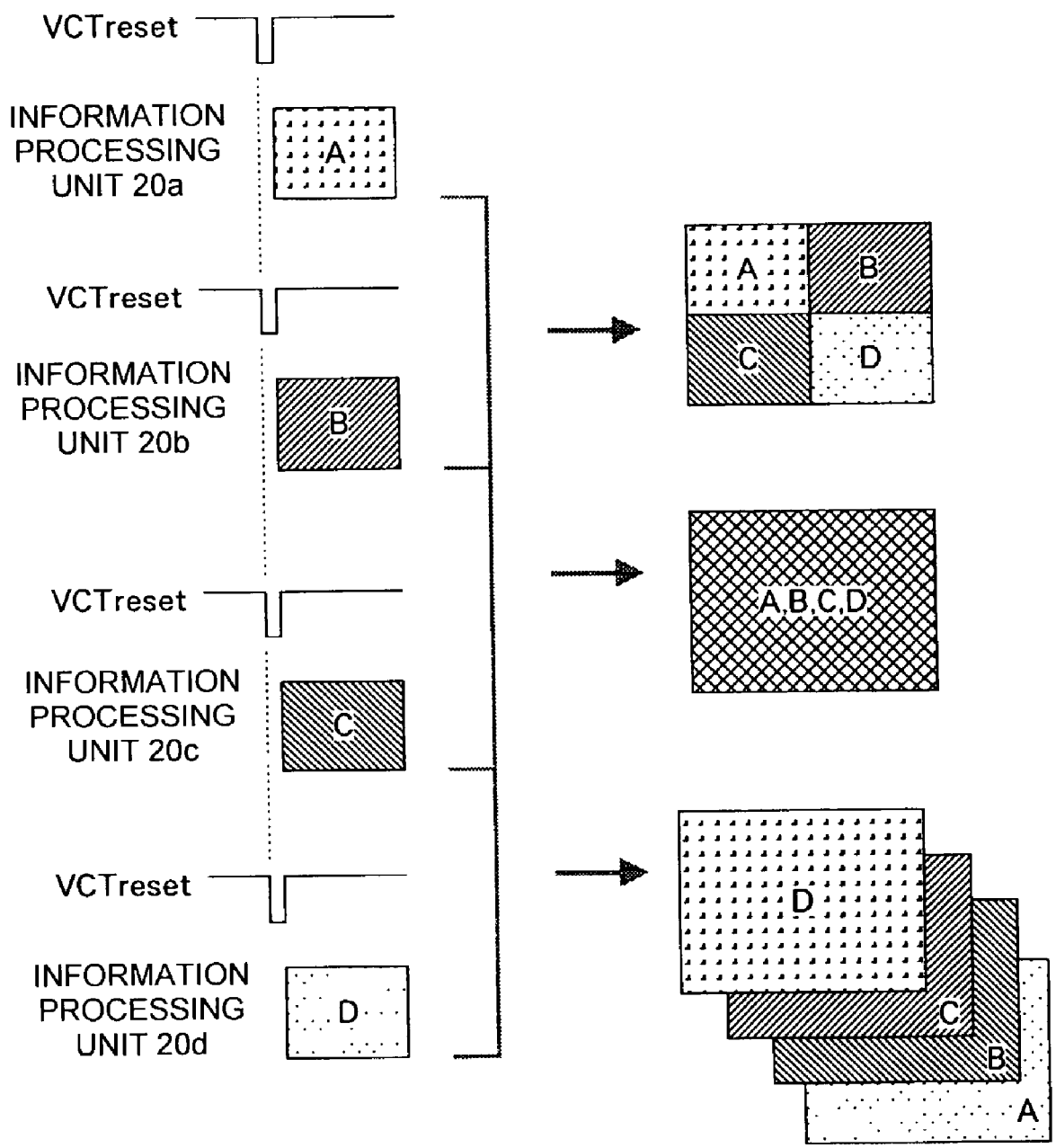
FIG. 5 is an illustration of an example of image merging.

For example, as shown in FIG. 5, the reset signal VCTreset is supplied to the information processing units 20a to 20d at the same timing to cause the information processing units 20a to 20d to produce the frame signals A, B, C, and D, respectively. Merging the frame signals A to D by the merge unit 30 provides results of pattern integration as shown on the right side in FIG. 5, on a common time line of the system.

As to the results of integration shown on the right side in FIG. 5, the result at the top corresponds to an example of simple merging of regions. The middle corresponds to an example of scene anti-aliasing that is applied when the information processing units 20a to 20d have images that are identical but are shifted by some pixels (with the proviso that the data to generate such an image are distributed). Alpha-blending is used for these images laid on top of each other. Starting with the sample point farthest from the viewpoint, the alpha-blending can combine images with depth when a frame signal includes Z information indicating the depth or an alpha value indicating the degree of transparency. The bottom view in FIG. 5 shows an example of integration for flip animation.

Figure 6:
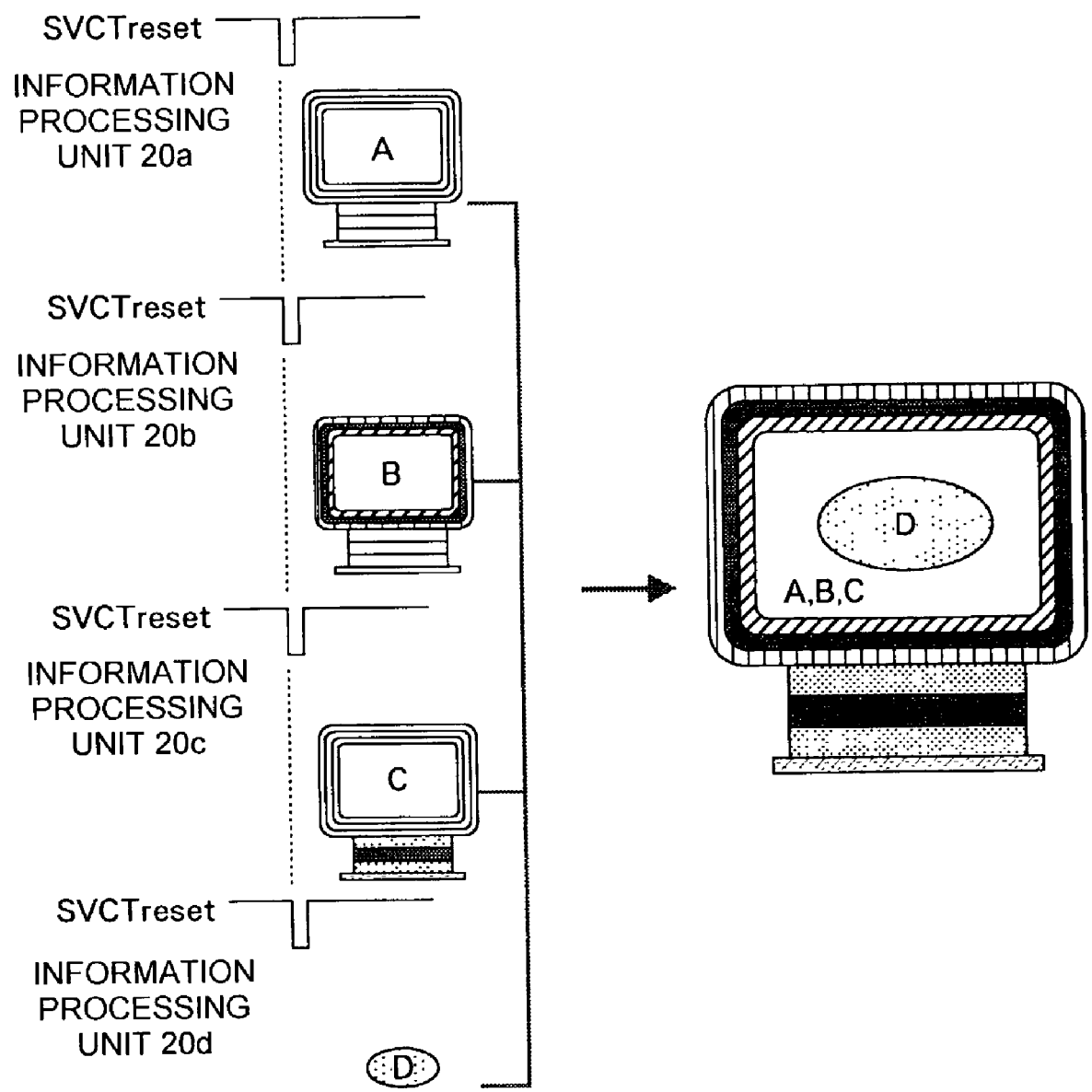
FIG. 6 is an illustration of another example of image merging.

Alternatively, the reset signal VCTreset may be supplied to the information processing units 20a to 20d at the same timing. In such a case, it is possible to use, as shown in FIG. 6, the frame signal A for a contour of the image to be drawn, the frame signals B and C for the color and patterns of the image, and the frame signal D for an object that makes up a portion of the image, and then combine the images for output. Alpha-values may be contained in some frame signals. This makes it possible to produce various different colors by combining a plurality of frame signals.

Figure 7:
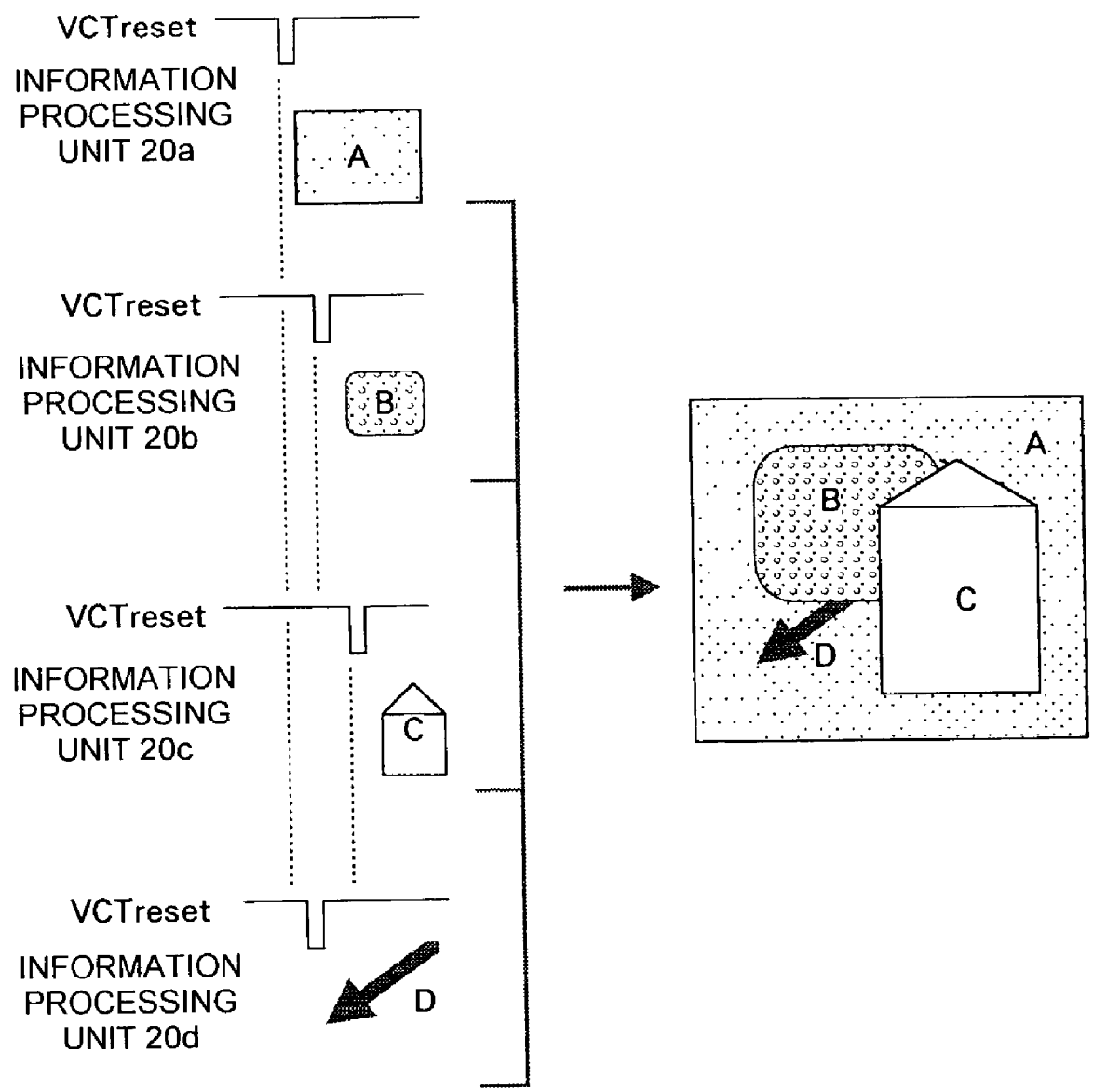
FIG. 7 is an illustration of another example of image merging.

Furthermore, the information processing units 20a to 20d may be assigned with their own contents and procedures of detailed image processing that use the contents, and the reset signal VCTreset is supplied to the information processing units 20a to 20d at different timing. This makes it possible to produce an image as shown in FIG. 7 in which different objects appear in their corresponding positions at different timing.

The information processing units 20a to 20d may be assigned with operations to generate data of broken music of different instruments. Simultaneous supply of the reset signal VCTreset to the information processing units 20a to 20d can produce concerto grosso or symphonies for various different instruments. Alternatively, some information processing units may be assigned with execution of image processing while other information processing units may be assigned with execution of sound processing. The reset signal VCTreset may be supplied to the information processing units in such a manner that the sound processing begins some frames after the beginning of the image processing. This makes it possible to produce images first and then make music.

As described above, the process timing of all information processing units 20a to 20d is defined by using the same (common) vertical synchronization clock Vsync and sub vertical synchronization clock SVsync in the present embodiment. The time lines of the cooperative processing can be used as the absolute reference for the information processing units even when the distributed processing is used. Various modes of integration and combination can be achieved accordingly.

The present embodiment which facilitates synchronization between images and sounds can be used to produce digital movies with sound in which combined sounds such as symphonies are reproduced in cooperation with changes in images.

The above-mentioned approach simplifies the operation by the merge unit 30, which in turn simplifies the whole configuration of the integrated information processing system 1. Reduction in cost may thus be feasible.

(Processor Unit)

Next, specific description is made about the processor units 21 in the information processing units 20a to 20d that are used to achieve the above-mentioned integrated information processing.

Figure 8:
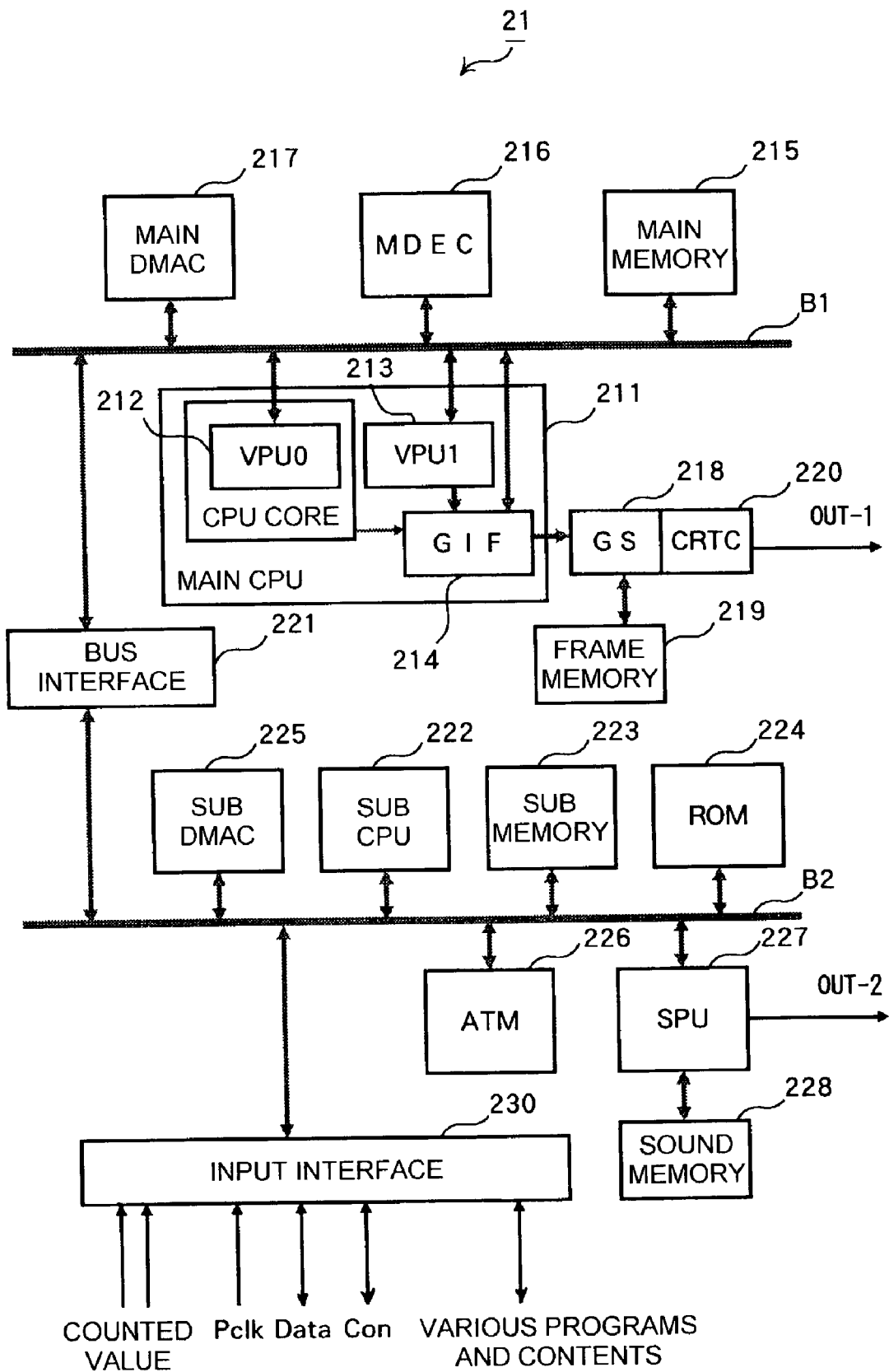
FIG. 8 is a detailed configuration view of a processor unit according to the present embodiment.

The processor unit 21 is capable of processing both images and sounds. For example, as shown in FIG. 8, the processor unit 21 comprises two buses, that is, a main bus B1 and a sub bus B2. The buses B1 and B2 are connected to and disconnected from each other through a bus interface 221. The main bus BI is connected to a first VPU (vector processing unit: 0) 212, a second VPU (VPU 1) 213 which is independent of others, a main CPU 211, a main memory 215, an MPEG (Moving Picture Experts Group) decoder (MDEC) 216, and a main DMAC (direct memory access controller) 217. The main bus B1 is also connected to a GS (graphical synthesizer) 218 through the GIF (graphical synthesizer interface) 214. The first VPU 212 is closely coupled with the CPU core. The main CPU 211 is formed of, for example, a GIF 214 and serves as an arbiter for the first VPU 212 and the second VPU 213. The GS 218 is for drawing images in cooperation with a frame memory 219. A CRTC (CRT controller) 220 is provided to produce a result of drawing as a video output signal OUT-1 to a display device which is not shown.

Upon activation, the main CPU 10 reads a bootstrap program from a ROM 224 on the sub bus B2 through the bus interface 221, and runs the bootstrap program to start an operating system. The main CPU 10 also reads programs, contents, and data supplied from the control unit 10, through the input interface 230. The main CPU 10 then stores the programs, contents, and data in the main memory 215. Furthermore, the main CPU 10 successively receives counted values obtained by the counter for synchronization purpose 22 and/or the sub counter for synchronization purpose 23 as well as a process unit clock Pclk through the input interface 230 to determine the process timing of the whole processor unit. This makes it possible to execute desired processing that is determined according to the contents of the program.

The main CPU 211 and the first VPU 212 cooperatively performs delicate processing, such as calculation of apex coordinates of a complicated polygon. The second VPU 213 is for operations associated with a relatively simple polygon. Examples of the operations include calculation of apex coordinates of a simple polygon, perspective transformation, and calculation of a parallel light source. The two different VPUs 212 and 213 generate a display list in which polygon definition information is described. The display list is transferred to the GS 218 through the GIF 214. The polygon definition information consists of drawing area setting information and information of a polygon to be drawn. The GIF 214 arbitrates the collision between the display lists during the transfer of them to the GS 218. For example, the GIF 214 checks the display lists in the order of priority and transferring them to the GS 218 sequentially in order of precedence. The GS 218 draws a polygon on the frame memory 219 based on the display lists supplied from the GIF 214. The GS 218 then supplies the drawing content to the display device through the CRTC 220.

The main DMAC 217 controls not only DMA transfer to each circuit connected to the main bus B1, but also DMA transfer to each circuit connected to the sub bus B2 according to the state of the bus interface 221.

The MDEC 216 operates in parallel with the main CPU 211 to decompress data compressed, for example, in the MPEG (Moving Picture Experts Group) or JPEG (Joint Photographic Experts Group) format.

The sub bus B2 is connected to a sub CPU 222, a sub memory 223, a sub DMAC 225, a ROM 224, a sound processing unit (SPU) 227, a communication control unit (ATM) 226, and an input interface 230. The ROM 224 stores programs such as an operating system. The SPU 227 reads sound data accumulated in a sound memory 228 to output the same as an audio output to a speaker. The ATM 226 is for exchanging other data or adjusting a starting point of beginning operation.

The sub CPU 222 controls various operations according to the programs stored in the ROM 224. The sub DMAC 225 controls operations such as DMA transfer to each circuit connected to the sub bus B2 only when the bus interface 221 disconnects the main bus B1 from the sub bus B2.

(Operation Form)

Next, description is made about an operation form of the integrated information processing system 1 according to this embodiment.

In response to the reception of data (e.g., sounds, images) to be integrated, the control unit 10 supplies a trigger to the information processing units 20a to 20d and the merge unit 30. In response to this, the information processing units 20a to 20d reset the counter for synchronization purpose 22 and the sub counter for synchronization purpose 23 to match the clock within the system as a preliminary step towards the integration. The processor units 21 of the information processing units 20a to 20d each adjust their own starting point of operation (the above-mentioned offset and associated allocation of processing) for processing that they should perform.

Then, the control unit 10 distributes the data to the information processing units 20a to 20d.

The data are processed according to the assignment and produced as a frame signal. The frame signals from the information processing units are supplied to the merge unit 30 where they are merged with each other. Integration in the merge unit 30 is performed along the time line defined by the counted values of the vertical synchronization clock Vsync, the sub vertical synchronization clock SVsync.

When a frame signal from one of the information processing units is lost, the merge unit 30 ignores the lost frame signal during integration. The integrated information is produced through a display device and/or a speaker.

The integrated information processing system 1 itself may be operated in the manner described above. However, it may be arranged into a cascade of multiple stages to provide a multi-stage integrated information processing system. In such a case, an output of a merge unit in the previous stage is used as an input to the control unit in the subsequent stage. The control unit on the inputmost side has the overall control of the vertical synchronization clock Vsync, the sub vertical synchronization clock SVsync, and the reset signal VCTreset. A final result of the integration is produced by the merge unit in the last stage.

As apparent from the above, in the integrated information processing system 1 according to the present embodiment, the plurality of information processing units are conformed in process timing to the sole absolute time reference by using the vertical synchronization clock Vsync and the sub vertical synchronization clock SVsync, while the operations of the information processing units are separately controlled by the reset signal VCTreset. Therefore, large screen images and sounds with high quality can be obtained easily.

The information processing units each serves as an independent information processing means that can be assigned with different processing and operations, providing a variety of different expressions.

In the above description, the integrated information processing system 1 used as an example comprises the control unit 10, the information processing units 20a to 20d, and the merge unit 30. However, the information processing system of the present invention may be achieved in various other configurations with a plurality of information processing mechanisms that are loosely coupled with each other, and a merge mechanism that is capable of merging the information processing results supplied from the information processing mechanisms according to the unit of output that is determined based on the type of an information output mechanism for producing the processing results. Accordingly, the present invention is not limited to the configuration described in conjunction with the above embodiment.

For example, the present invention may be applied to a configuration where a certain node (information processing mechanism or device) of a wide area network is used as a control mechanism in place of the above-mentioned control unit 10, and some others are used as information processing mechanisms and a merge mechanism in place of the above-mentioned information processing units 20a to 20d and the merge unit 30, respectively.

Alternatively, the wide area network may be connected to a computer. A predetermined computer program may be loaded onto the computer for execution. Consequently, the computer may be operated as a control mechanism that controls information processing mechanisms such as the above-mentioned information processing units 20a to 20d.

As apparent from the above, according to the present invention, distributed processing achieved by multiple information processing units can be controlled at exact timing. Integration of such distributed processing results in easy production of images or sounds with high quality.

The invention claimed is:

1. An information processing system comprising:
a plurality of information processing mechanisms that are coupled to each other;
a merge mechanism that merges processing results supplied from said information processing mechanisms; and
a control mechanism that controls operations of said information processing mechanisms;
each of said plurality of information processing mechanisms including a counter for synchronization purpose and processing means, the counter for synchronization purpose being adapted to count the number of synchronization clocks that are used to determine a starting point of operation for the processing that the local information processing mechanism should perform, the processing means being for carrying out a desired processing based on the measured value obtained by the counter for synchronization purpose;
said control mechanism being for simultaneously providing a trigger of measurement of the synchronization clocks to all counters for synchronization purpose included in said information processing mechanisms, and for individually providing a reset signal to the counters for synchronization purpose, the reset signal being for initializing the measured value obtained by the counters for synchronization purpose; and
said merge mechanism being for merging the processing results according to the unit of output that is determined based on the type of an information output mechanism for producing the processing results.

2. The information processing system as claimed in claim 1, wherein
the counters for synchronization purpose included in said plurality of information processing mechanisms each includes a first counter and a second counter, the second counter being adapted to produce a measured value at whole number fractions of the measured value obtained by the first counter,
the processing means being for performing a predetermined processing based on the measured values obtained by the first counter and the second counter.

3. The information processing system as claimed in claim 2, wherein
each of said plurality of information processing mechanisms is configured such that a starting point of operation for the processing of the local information processing mechanism coincides with starting points of operation for the processing of other information processing mechanisms.

4. The information processing system as claimed in claim 3, wherein
each of the processing means included in said plurality of information processing mechanisms is configured such that the processing means detects the passage of time from the starting point of operation depending on the measured value of the counter for synchronization purpose to perform a predetermined processing based on the detection result.

5. The information processing system as claimed in claim 4, wherein
each of the processing means included in said plurality of information processing mechanisms is configured such that the processing means performs processing to generate at least either image data or sound data that are to be merged, independent of the processing means included in other information processing mechanisms.

6. The information processing system as claimed in claim 1, wherein
said control mechanism includes a counter for control purpose having the same function as the counters for synchronization purpose that are included in said information processing mechanisms, said control mechanism being configured to produce the reset signal based on the measured value obtained by the counter for control purpose.

7. The information processing system as claimed in claim 1, wherein
said merge mechanism is configured to merge the processing results of corresponding information processing mechanisms at a predetermined timing independent of the processing status in said plurality of information processing mechanisms.

8. The information processing system as claimed in claim 1, wherein
the merged result that is produced from said merge mechanism is used as an input to said control mechanism located at a subsequent stage, thereby achieving a cascade of multiple stages.

9. An information processing system configured in such a manner that information processing system is connectable to a network having a plurality of information processing mechanisms that are coupled to each other and a merge mechanism connected to the information processing mechanisms, the merge mechanism being for merging the processing results supplied from said information processing mechanisms according to the unit of output that is determined based on the type of an information output mechanism for producing them, the information processing system including a control mechanism,
each of the information processing mechanisms comprising an adjustment mechanism, and a counter for synchronization purpose, the adjustment mechanism being for adjusting a starting point of operation for processing that the local information processing mechanism should perform, the starting point of operation being determined with and among other information processing mechanisms, the counter for synchronization purpose counting the number of synchronization clocks, and each of the information processing system being for performing a required processing based on the starting point of operation adjusted by the adjustment mechanism and the measured value obtained by the counter for synchronization purpose, said control mechanism is constructed for simultaneously providing a trigger of measurement of synchronization clocks to all counters for synchronization purpose included in said information processing mechanisms, and for individually providing a reset signal to the counters for synchronization purpose, the reset signal being for initializing the measured value obtained by the counters for synchronization purpose.

10. A method for processing information comprising:
connecting a plurality of information processing mechanisms, a merge mechanism, and a control mechanism to each other through a network, the plurality of information processing mechanisms being coupled to each other to perform a desired processing depending on a measured value for their respective predetermined synchronization clocks, the merge mechanism being for merging the processing results supplied from the information processing mechanisms according to the unit of output that is determined based on the type of an information output mechanism for producing them, the control mechanism controlling operations of the information processing mechanisms; and simultaneously supplying the synchronization clock from the control mechanism to all information processing mechanisms and individually supplying a reset signal to counters for synchronization purpose, the reset signal being for initializing measurements of the counters for synchronization purpose.

11. The method for processing information as claimed in claim 10, wherein
some of the plurality of information processing mechanisms handle reproduction of image data, and some other of the plurality of information processing mechanisms handle reproduction of sound data, and wherein
the merge mechanism merges the processing results obtained by these information processing mechanisms at a predetermined timing.

12. A computer readable recording medium in which a computer program is recorded, said computer program can be executed on a computer being connectable to a network, wherein
a plurality of information processing mechanisms that are coupled to each other, and a merge mechanism connected to the information processing mechanisms are connected to the network, each information processing mechanism performs a desired processing based on a measured value of the number of predetermined synchronization clocks, the merge mechanism being for merging the information processing results supplied from the information processing mechanisms according to the unit of output that is determined based on the type of an information output mechanism for producing them,
said computer program used to cause the computer to operate by
providing a trigger of measurement of the synchronization clocks to all information processing mechanisms, and for individually providing a reset signal to the information processing mechanisms, the reset signal being for initializing the measured value obtained by the counters for synchronization purpose.

* * * * *